May 11, 1926.
H. B. BRISTOL
INDICATING DEVICE FOR SYNCHRONIZING THE BRAKING POWER
APPLIED TO THE WHEELS OF VEHICLES
Filed April 3, 1925
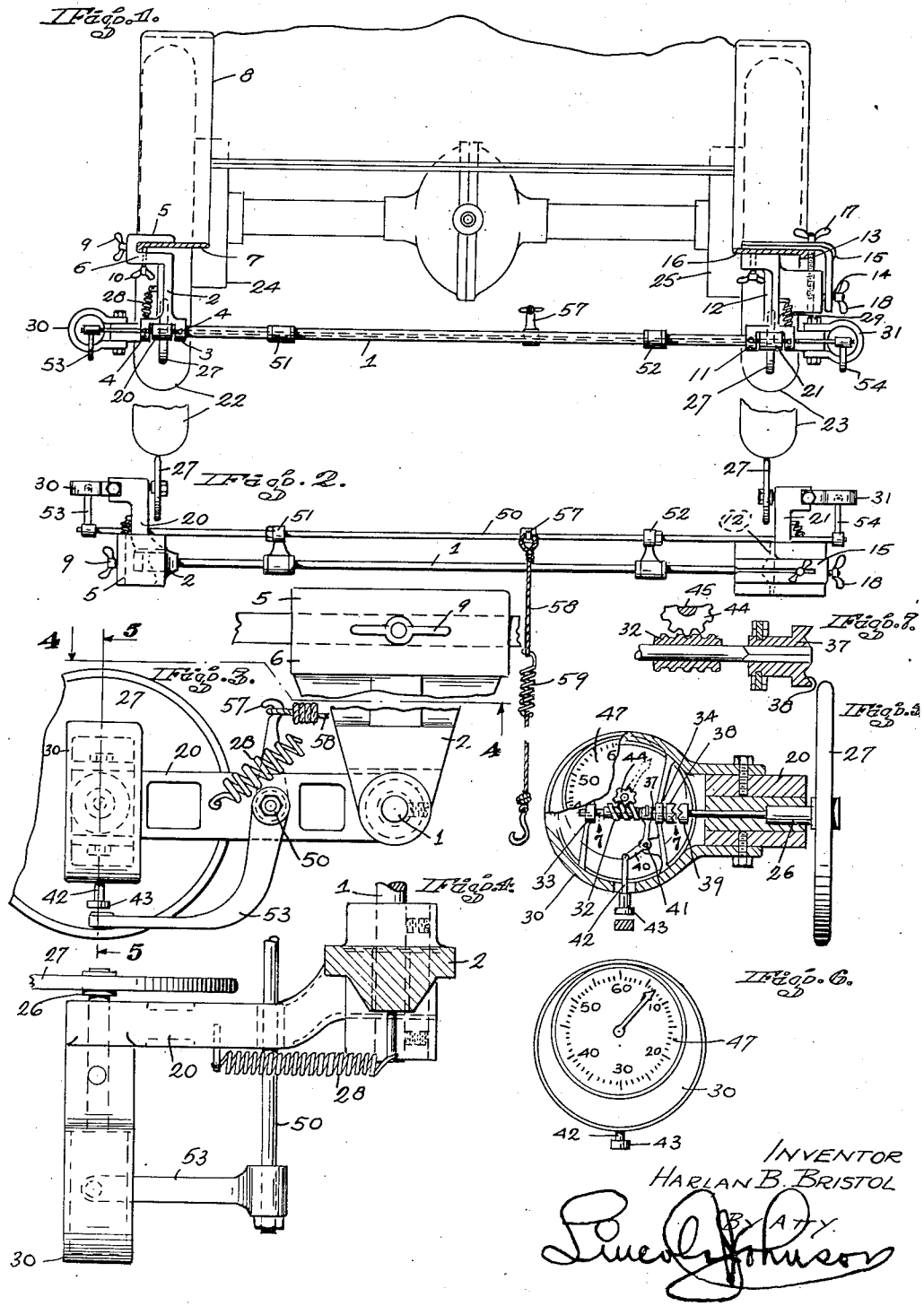
INVENTOR
HARLAN B. BRISTOL Patented May 11, 1926.

1,584,076

UNITED STATES PATENT OFFICE.

HARLAN B. BRISTOL, OF BURLINGAME, CALIFORNIA.

INDICATING DEVICE FOR SYNCHRONIZING THE BRAKING POWER APPLIED TO THE WHEELS OF VEHICLES.

Application filed April 3, 1925. Serial No. 20,397.

This invention relates particularly to a device to indicate the variance in the number of revolutions which a single wheel or plurality of wheels will turn after braking power has been applied to said wheel or wheels.

An object of the invention is to provide an apparatus to be used in testing the result of the applying of the brakes to each of the opposite driven wheels of a vehicle, in order that any unequal application of the braking power might be synchronized.

A further object of the invention is to provide a brake testing apparatus that can be detachably arranged on the body of an automobile or upon the framework of any machine, having wheels thereon the rotation of which is controlled by brakes, whereby it is possible to unify the application of the braking power to the wheels and to eliminate the possibility of greater braking effort being applied upon one wheel than the other.

A further object of the invention is to provide a device of the character described that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings

Fig. 1 represents a front elevation of a brake testing apparatus constructed in accordance with my invention.

Fig. 2 is a plan view of Fig. 1.

Fig. 3 is an enlarged end view of Fig. 1.

Fig. 4 is a plan section taken through Fig. 3 on the line 4—4.

Fig. 5 is a cross section taken through Fig. 3 on the line 5—5.

Fig. 6 is a front elevation of the indicating dial, partially shown in Fig. 5.

Fig. 7 is an enlarged section taken through Fig. 5 on the line 7—7.

The conventional manner in which the brakes of an automobile are tested to determine if the application of the braking power is uniformly applied to both driven wheels at the same time, or to determine if the application of the braking power is unequal, is mostly a matter of guess work by the operator conducting the test. The average automobile mechanic uses the naked eye, to see which wheel stops first. However, this is far from accurate, as one wheel may have made several more revolutions than the other, although both appear to stop at the same time. Another method is to have the operator apply the brakes and then for the mechanic to manually attempt to move the wheels and in this manner, detect by the effort required, the difference in the adjustment of the brake bands. My invention contemplates a structure in which it is possible to absolutely determine if the braking effort is applied to the vehicle wheels at the same time, and with the same force, or if the braking power is applied to the opposite wheels at different intervals and with unequal force.

In detail, the construction illustrated in the drawings comprises a frame 1, consisting of a cross bar of iron, wood, or any other suitable material. One end of the frame 1 is provided with a bracket 2 having a forked bearing 3 therein. The bearing portion 3 of the bracket 2 is secured to the frame 1 by means of set screws or pins 4. The upper end of the bracket 2 is substantially U shaped in contour, and consists of the upper and lower lips 5 and 6, which are adapted to pass respectively over the upper and lower faces of the running board 7, formed on the diagrammatically illustrated vehicle 8 shown in Fig. 1.

A pair of thumb screws 9 and 10 are mounted in the upper end of the bracket 2 and are adapted to be advanced into or from contact with the running board 7, for positioning the bracket 2 in substantially a fixed position on said running board. The opposite end of the frame 1 is joined at 11 to a bracket 12. The outer face of the bracket 12 is provided with studs 13 and 14 therein, around which a detachable clamping member 15 is adapted to be received. The running board 16 on the side of the vehicle 8 opposite the board 7 is adapted to be received between the upper face of the bracket 12 and the under face of the clamp member 15. Wing nuts 17 and 18 are adapted to be screwed on to the studs 13 and 14 for binding the adjustable clamping member 15 to the bracket 12 and tightly gripping the running board 16. The running board gripping members on the brackets 2 and 12 are wide enough when attached to the said running boards to prevent any tipping or swinging movement of the frame 1. The clamp 15 is adjustable on the bracket 12 so that the space between brackets may be increased or diminished to fit vehicles of different widths.

An arm 20 is pivotally mounted around the frame 1 within the forked portion 3 of the bracket 2, and a similar arm 21 is mounted around the opposite end of the frame 1 within the bracket 12. The forked portions of the brackets 2 and 12 allow the arms 20 and 21 to have a free radial movement but prevent any axial movement thereof. Each of the arms 20 and 21 are arranged in substantial alignment with the opposite traction wheels 22 and 23, respectively, of the vehicle 8. As in standard practice each of the wheels 22 and 23 are equipped with brake drums 24 and 25, respectively, whereby the rotation of said wheels might be stopped when desired. On the inside face of each of the arms 20 and 21, I have journaled shafts 26 and on the outer end of each shaft I have fixed a roller wheel 27. Each of the roller wheels 27 are adapted to engage the peripheries of the respective traction wheels 22 and 23. The wheels 22 and 23 are of standard gauge and hence the rollers 27 are fixed on the frame 1 a predetermined distance apart equivalent to a standard gauge. Suitable springs 28 and 29 connect the arms 20 and 21 respectively to the brackets 2 and 12. The springs 28 and 29 are of sufficient tension to lift the arms 20 and 21 and to hold the rollers 27 against the traction wheels under normal testing conditions, and to allow for any slight deviation in the wheel contour which might be encountered.

On the outer faces of each of the arms 20 and 21, I have provided the respective indicator casings 30 and 31. In each of the casings 30 and 31 I have the same kind of indicator mechanisms, each of which consist of a worm 32 journaled at its opposite ends in the bearings 33 and 34. An end of the worm shaft 32 is splined to receive a slide collar 37. An end of the slide collar 37 is provided with a jaw clutch 38 thereon. The end of each of roller shafts 26, extending within the housing 30 or 31, is provided with a jaw clutch member 39 thereon, adapted to be engaged with the collar clutch member 38. In order to move the clutch members 38 and 39 into or from engagment, I have provided a bell crank 40 pivotally connected to each worm operating collar 34, the bell crank 40 being pivoted at 41 within the indicator casing and having an operating pin 42 pivotally connected to the free end thereof. The operating pin 42 extends outwardly through the indicator casing and is provided with a button 43 thereon adapted to be actuated in the manner to be hereinafter described. A similar wheel 44 is journaled in each of the indicator casings in mesh with each worm 32. Each worm wheel 44 is carried by a shaft 45, to which each pointer 46 is fixedly secured. Dials 47 are arranged in the indicator casings 30 and 31, over the pointer indicating mechanism, said dials being suitably graduated into any desired scale.

A rod 50 is journaled at each of its opposite ends in the arms 20 and 21, and intermediate its ends the rod 50 is revolubly supported in brackets 51 and 52, secured on the frame member 1. The extreme outer ends of the rod 50 are provided with arm members 53 and 54 thereon, the free ends of which are adapted to be moved into and from engagement with the buttons 43 to control the operation of the respective indicator mechanisms. An axially adjustably arm 57 is attached on the rod 50 to be connected by a cable or rod 58 to the lever mechanism by means of which the wheel brakes 24 and 25 are operated. The cable 58 is provided with a coil spring 59 therein, to compensate for any excessive pull applied to the cable by the brake operating levers.

My invention operates in the following manner:

In the case of an automobile, truck, or the like, the operator desiring to test the brakes would clamp the frame 1 on to the opposite running boards of the vehicle so that the opposite rollers 27 would align with the outer peripheries of the traction wheel 22 and 23. The vehicle itself would be jacked up off the ground, so that the wheels 22 and 23 would be free to revolve. The rotation of the wheels 22 and 23 causes the rollers to be revolved therewith, but without any operation of the indicator mechanism in the casings 30 and 31. During the operation of clamping the frame 1 on to the vehicle, the brake tester would also connect the cable 58 on to some portion of the brake operating levers. Thus at the proper interval, after the vehicle traction wheels are running, the operator would disconnect the positive driving force therefrom and actuate the braking mechanism so as to retard and gradually stop the rotation of the wheels 22 and 23. Simultaneously with the operation of the vehicle brakes the cable 58 would be moved so as to partially rotate the trip rod 50 and lift the ends of arms 53 and 54 into contact with the buttons 43 on the indicator mechanism so as to engage each of the said indicator mechanisms with the shafts of the rollers 27. The actuation of the indicator mechanisms would cause the pointers 46 to be moved relative to the dials 47. At the commencement of the brake testing operation, each of the dials would be set at zero, or the positions of the pointers on the dials noted. Thus as the vehicle brakes 24 and 25 would gradually cause the wheels 22 and 23 to come to a stop, the pointers 46 would indicate the variance in the number of revolutions which each of the respective vehicle wheels might make before reaching an actual stop. The degree of the variance in the position of the indicators on each of the opposite wheels, would show how much faster the brake on one wheel might be gripping over the brake on the opposite wheel. By the use of my indicating apparatus, it is possible to determine the relative difference in the braking power of each of the wheel brakes and to permit adjustment of the same to bring about unitary operation thereof. Although I have shown and described the operation of my apparatus in conjunction with the traction wheels of a vehicle, it is to be understood that it would be clearly within the purview of this invention to use my testing apparatus wherever it would be desired to test braking adjustment on other types of revolving wheels.

Having thus described this invention, what I claim and desire to secure by Letters Patent is:—

1. A device, such as described, comprising a supporting frame positionable adjacent the driven wheels of a vehicle; rollers adjustably mounted on said frame adapted to be held in frictional contact with the peripheries of the driven wheels; a revolution indicator arranged adjacent each of the rollers; and means to connect the rollers with the revolution indicators synchronously with the slowing down of the driven wheels.

2. A device for synchronizing the applying of brakes to the opposite traction wheels of a vehicle, comprising a frame; means to position said frame adjacent each of the opposite wheels of the vehicle; a roller adjustably mounted on said frame in registering contact with each of the traction wheels; a revolution indicator arranged adjacent each of the rollers; a clutch interposed between each of the rollers and revolution indicators; and means, to clutch the respective pairs of rollers and revolution indicators together, operated in unison with the applying of the brakes to the opposite traction wheels.

3. In combination, a vehicle having driven wheels thereon; brakes on said wheels to stop rotation thereof; means to actuate said brakes; a roller in frictional contact with each of said driven wheels; a revolution indicator arranged adjacent and operable by each of the rollers; and means connecting each revolution indicator to the brake actuating means to operate the revolution indicators and brakes at the same time.

4. A device for synchronizing the applying of brakes to the opposite driven wheels of a vehicle comprising a frame; clamp means on the opposite ends of said frame to detachably hold said frame onto the opposite sides of a vehicle; an arm pivotally mounted adjacent each of the opposite ends of said frame; a roller revolubly journaled in the free end of each of said arms; a spring connecting each of the pivoted arms to the frame to hold each of the rollers in contact with each of the vehicle driven wheels; an indicating device operable by each of the rollers to indicate the variance in the number of revolutions of each of the respective vehicle wheels; and means operable with the applying of the brakes to the vehicle driven wheels to actuate each of the roller indicating devices.

In testimony whereof, I have hereunto set my hand at San Francisco, California, this 24th day of March 1925.

HARLAN B. BRISTOL.